(12) United States Patent  (10) Patent No.: US 7,374,009 B2
Yamamoto et al.  (45) Date of Patent: May 20, 2008

(54) CONTROL BOX MOUNTING BRACKET (75) Inventors: Takao Yamamoto, Wako (JP);
Tomohiko Yashiro, Wako (JP); Shigeto Inami, Wako (JP); Masaki Yamazaki, Wako (JP); Kunihiko Fukui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 11/087,712

(22) Filed: Mar. 24, 2005

(65) Prior Publication Data
US 2005/0225057 A1 Oct. 13, 2005

(30) Foreign Application Priority Data
Mar. 30, 2004 (JP) ............................. 2004-099947

(51) Int. Cl.
*B60K 26/00* (2006.01)
(52) U.S. Cl. .................... 180/291; 248/674; 123/195 E
(58) Field of Classification Search ................ 180/291, 180/293; 248/674, 675, 200, 220.21, 226.12; 123/647, 195 E
See application file for complete search history.

(56) References Cited

U.S. PATENT DOCUMENTS

| 5,207,288 | A | * | 5/1993 | Ono ............................. 180/220 |
| 5,595,257 | A | * | 1/1997 | Yoshida et al. ............. 180/287 |
| 5,947,435 | A | * | 9/1999 | Small ....................... 248/309.1 |
| 6,717,051 | B2 | * | 4/2004 | Kobayashi et al. ......... 174/535 |
| 6,778,402 | B2 | * | 8/2004 | Nasu et al. .................. 361/756 |
| 6,788,539 | B2 | * | 9/2004 | Skofljanec .................. 361/719 |

FOREIGN PATENT DOCUMENTS

JP 2002-70610 3/2002

* cited by examiner

*Primary Examiner*—Christopher Bottorff
(74) *Attorney, Agent, or Firm*—Westerman, Hattori, Daniels & Adrian, LLP.

(57) ABSTRACT

A control box mounting bracket is attached to a vehicle body frame. The control box mounting bracket mounts an engine control box on the vehicle body frame and in the periphery of the control box mounting bracket. The control box mounting bracket includes an attaching portion to which the control box is attached and a coupler support portion which supports a plurality of couplers.

4 Claims, 11 Drawing Sheets

FIG. 16

CONTROL BOX MOUNTING BRACKET

FIELD OF INVENTION

The present invention relates to a control box mounting bracket, and more particularly, to a control box mounting bracket which is suitably used for mounting a control box for controlling an engine on a suitable portion of a vehicle body.

BACKGROUND OF THE INVENTION

An engine control box, which controls an ignition system of an engine, a fuel system, or an electric system of a transmission and the like in a concentrated manner, is mounted on a motorcycle or an ATV (All Terrain Vehicle). The engine control box and the objects to be controlled at respective portions of the vehicle are electrically connected with each other by way of harnesses and couplers which are divided in accordance with respective systems also as disclosed in JP-A-2002-70610

SUMMARY OF THE INVENTION

In JP-A-2002-70610, the harnesses which are pulled out from the object to be controlled at respective portions of the vehicle and input/output sockets of the engine control box are connected with each other and hence, not only a large number of couplers and wires thereof are concentrated in the periphery of the engine control box, but also the directions of the wires are disposed irregularly. Accordingly, there has been a demand for enhancing the efficiency of the wire operation and the mounting operation. Further, there has been a case in which to prevent the elevation of a temperature of the engine control box due to heat generated by the engine and a cooler thereof, the mounting position of the engine control box is restricted.

Accordingly, it is an object of the present invention to provide a control box mounting bracket which can overcome the above-mentioned drawbacks and can regularly arrange couplers and wires in the periphery of the control box, and can alleviate the thermal influence to the control box from a heat source.

To achieve the above-mentioned object, the present invention provides a vehicle body frame wherein a control box mounting bracket which mounts the engine control box on the vehicle body frame and the frame structure is attached. In a first aspect of the present invention, the control box mounting bracket includes an attaching portion to which the control box is attached and a coupler support portion which supports a plurality of couplers. Therefore, the couplers of the wiring harnesses which are connected with the control box can be integrally handled with the control box.

In another aspect of the present invention, the coupler supporting portion supports the plurality of couplers in the same direction. Therefore, it is possible to arrange the directions of the wires which extend from the couplers in one direction.

In another aspect of the present invention, the control box is attached such that an outer periphery thereof is covered with a protective cover. Therefore, vibrations and impacts which are transmitted to the control box from the control box mounting bracket can be alleviated.

In another aspect of the present invention, the control box is mounted on a front portion of the vehicle body. Since the control box is mounted on the front portion of the vehicle body with the use of the control box mounting bracket, it is possible to arrange the control box in the vicinity of a meter panel where wires are concentrated, whereby the wires between the meter panel and the control box can be shortened.

In another aspect of the present invention, the control box mounting bracket includes a guide member which guides wiring harnesses in a given direction and the guide member also functions as a heat shielding plate. Accordingly, even when the control box is arranged behind the oil cooler, there is no possibility that the control box is exposed to a traveling wind (a hot wind) which is heated by the oil cooler.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the present invention will be described hereinafter with reference to the accompanying drawings.

Figure 1:
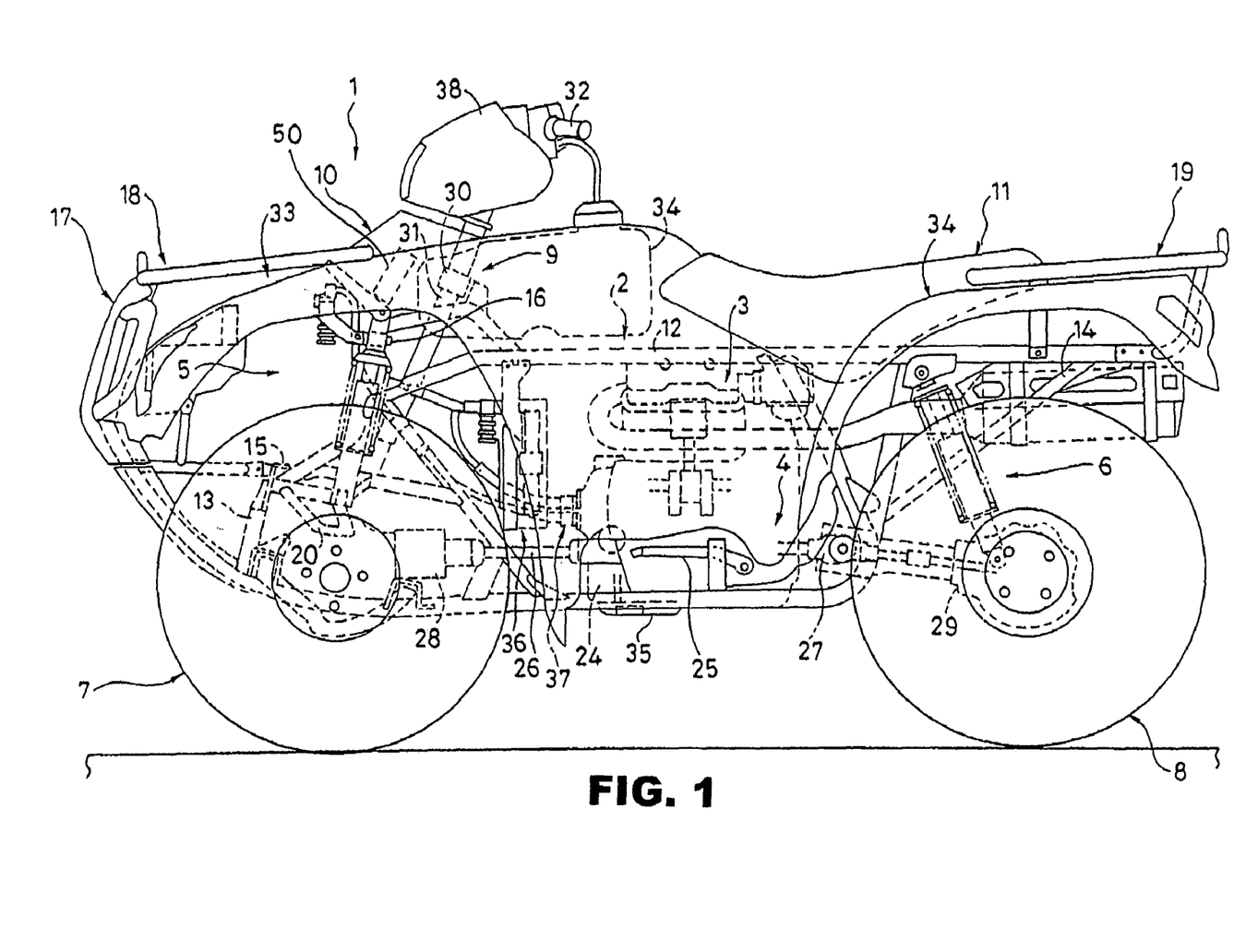
FIG. 1 is a side view of an ATV in which an engine control box is supported on a control box mounting bracket according to the present invention.
Figure 2:
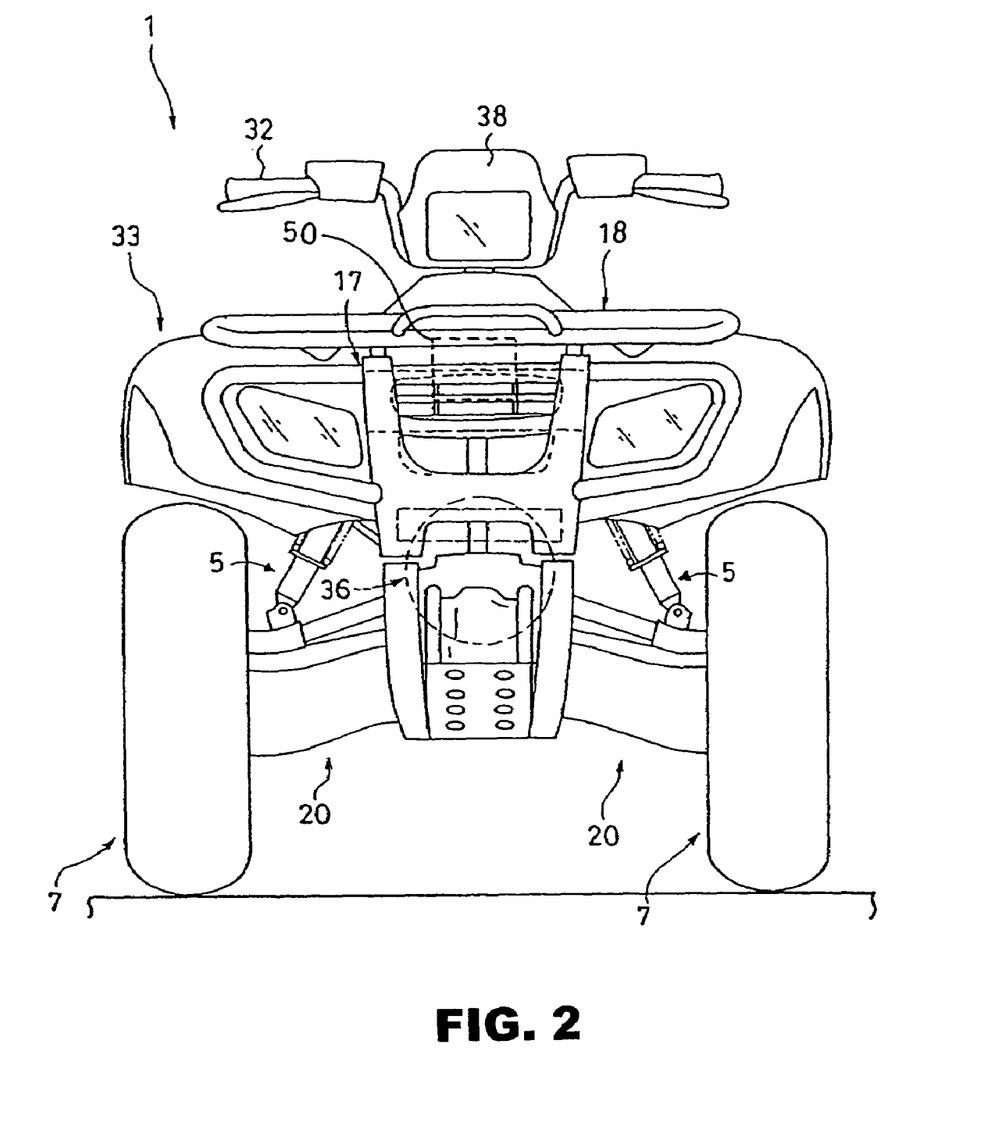
FIG. 2 is a front view of the ATV shown in FIG. 1.

FIG. 1 is a side view of an ATV in which an engine control box is supported by a control box mounting bracket according to the present invention and FIG. 2 is a front view of the ATV.

The ATV 1 includes a vehicle body frame 2, a four-cycle engine 3 which is mounted on a center lower portion of the vehicle body frame 2, a power transmission device 4 which is mounted on the vehicle body frame 2 and is connected with the engine 3, and a front suspension 5 and a rear suspension 6 which tiltably hold front and rear portions of the power transmission device 4 with respect to the vehicle body frame 2. Front wheels 7 are supported on left and right sides of the front portion of the power transmission device 4, while rear wheels 8 are supported on left and right sides of the rear portion of the power transmission device 4.

Further, the front wheels 7 and the rear wheels 8 are connected to the vehicle body frame 2 by way of the front suspension 5 and the rear suspension 6, respectively. A steering device 9 which is mounted on the vehicle body frame 2 is connected to the front wheels 7. A fender 10 is mounted on the vehicle body frame 2. A seat 11 is provided above the engine 3 for allowing an occupant to drive the ATV in an astride manner.

The vehicle body frame 2 includes a main frame 12, a front frame 13 and a rear frame 14 which are respectively mounted in front of and behind the main frame 12, a bracket 15 which is mounted between left and right sides below the front frame 13, and a cross member 16 which is mounted between left and right sides above the front frame 13. A front guard 17 and a front carrier 18 are mounted on a front portion of the front frame 13, while a rear carrier 19 is mounted on a rear portion of the main frame 12.

The power transmission device 4 includes a transmission 24 which is capable of driving four wheels, a gear change pedal 25, and a front drive shaft 26 and a rear drive shaft 27 which are connected to front and rear portions of the transmission 24. A front final reduction gear 28 which is mounted on a front arm 20 is connected with the front drive shaft 26, while a rear final reduction gear 29 is connected with the rear drive shaft 27. An oil pan 35 is arranged below the engine 3 and a cooling fan 36 which performs forced air cooling of the engine 3 and a lubricating mechanism 37 are arranged in front of the engine 3.

The steering device 9 includes a steering shaft 31 which is mounted on a front upper portion of the main frame 12 using a shaft holder 30, and a handle 32 which is mounted on the steering shaft 31. The fender 10 is constituted of a front cover 33 and a rear cover 34. On a rear portion of the steering device 9, a meter cover 38 is mounted. The meter cover 38 is a cover member which covers a light unit and, at the same time, constitutes a meter panel which arranges meters and the like on a rear portion thereof. At a position in front of the vehicle body frame 2 and below the meter cover 38, an engine control box 50 is supported on the vehicle body frame 2.

Figure 3:
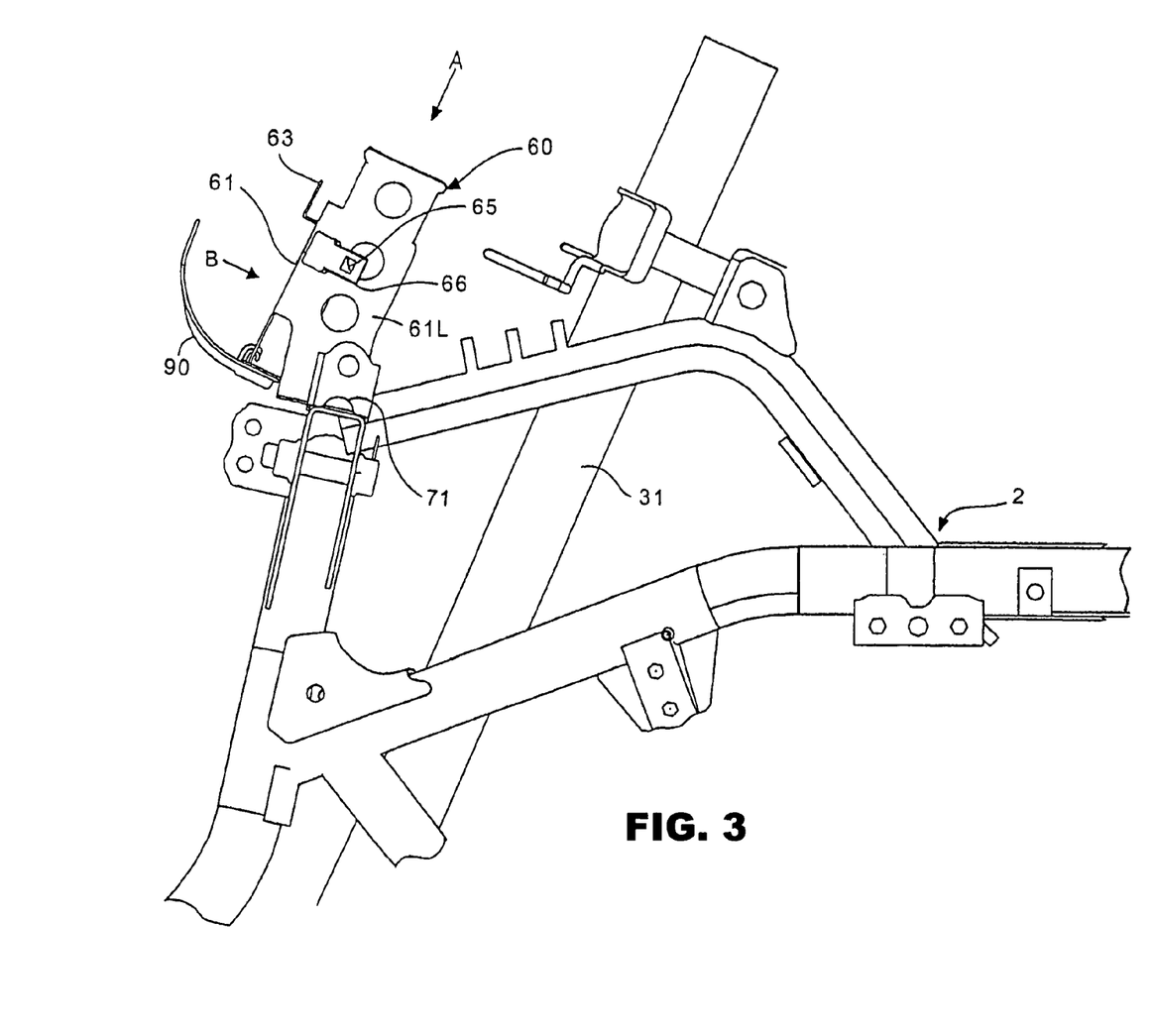
FIG. 3 is a side view showing a mounting position of the control box mounting bracket and the frame structure in the periphery of the control box mounting bracket.
Figure 4:
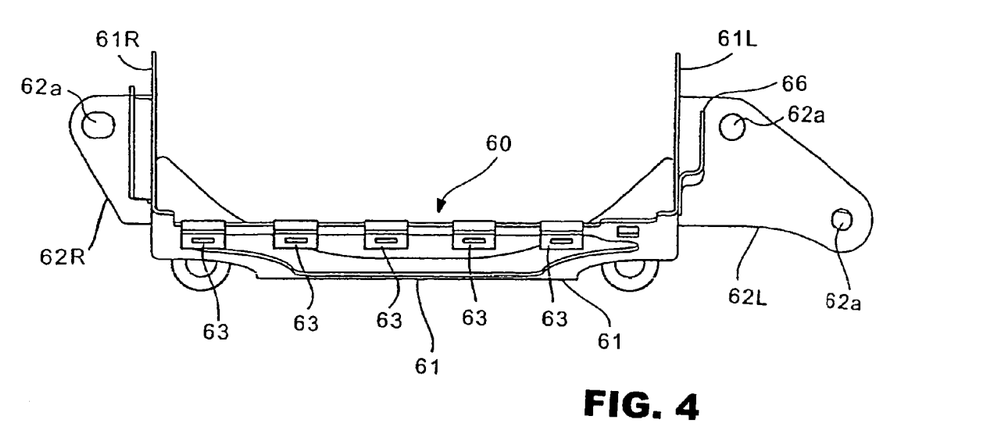
FIG. 4 is a view as viewed in the arrow direction A in FIG. 3.
Figure 5:
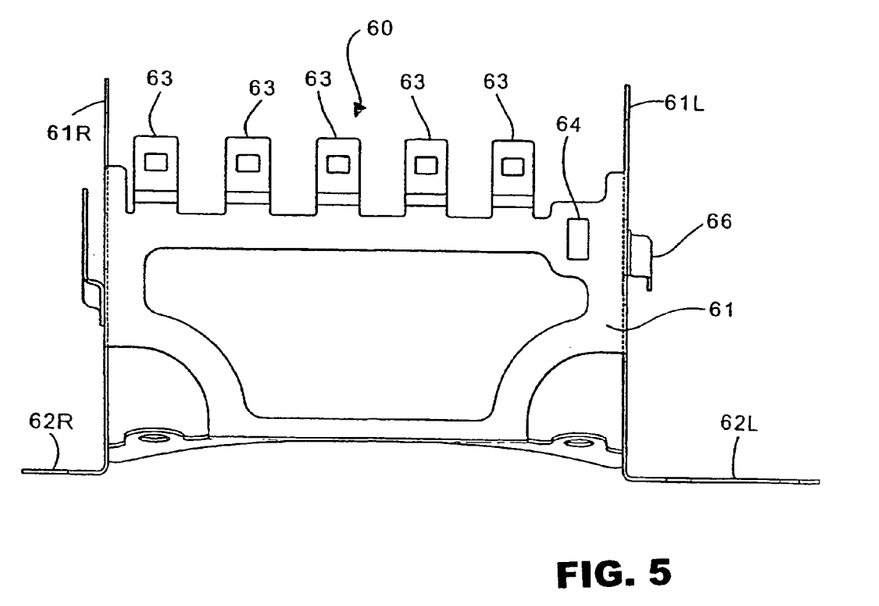
FIG. 5 is a view as viewed in the arrow direction B in FIG. 3.

FIG. 3 is a side view showing a control box mounting bracket 60 which mounts the above-mentioned engine control box 50 on the vehicle body frame 2 and the frame structure in the periphery of the control box mounting bracket 60. In the drawing, the same symbols indicate parts identical to or similar to the above-mentioned parts. FIG. 4 and FIG. 5 are respectively a drawing as viewed in the direction of an arrow A in FIG. 3 and a drawing as viewed in the direction of an arrow B in FIG. 3.

The above-mentioned control box mounting bracket 60 is a generally U-shaped sheet metal material which is constituted of a front plate 61 and left and right side plates 61R, 61L formed by bending both side portions of a metal plate at a right angle in the same direction. Flanges 62L, 62R are integrally formed on lower ends of the left and right side plates 61R, 61L. The flanges 62L, 62R include screw holes 62A. The control box mounting bracket 60 has the above-mentioned flanges 62L, 62R thereof fastened and fixed to the front upper portion of the vehicle body frame 2 using screws 71.

On the front plate 61 of the bracket 60, a plurality of hooks 63 for mounting couplers described later on the bracket 60 in the same direction are arranged laterally in a row such that the hooks 63 are directed upwardly. Further, an engaging hole 64 for mounting a coupler having a different shape is formed in the front plate 61. Further, also on the left side plate 61L, a hook 66 in which an engaging hole 65 for mounting a coupler is formed in the same manner.

A heat shielding plate 90, extending while curving in the frontward and upward direction, is mounted on a front lower end portion of the above-mentioned control box mounting bracket 60. The heat shielding plate 90 functions as a guide member which guides harnesses (wires) in a given direction and, at the same time, prevents the engine control box 50 from being heated by a traveling wind (a hot wind) which is warmed after passing an oil cooler 91 (see FIG. 14) which is arranged in front of a mounting position of the engine control box 50.

Figure 6:
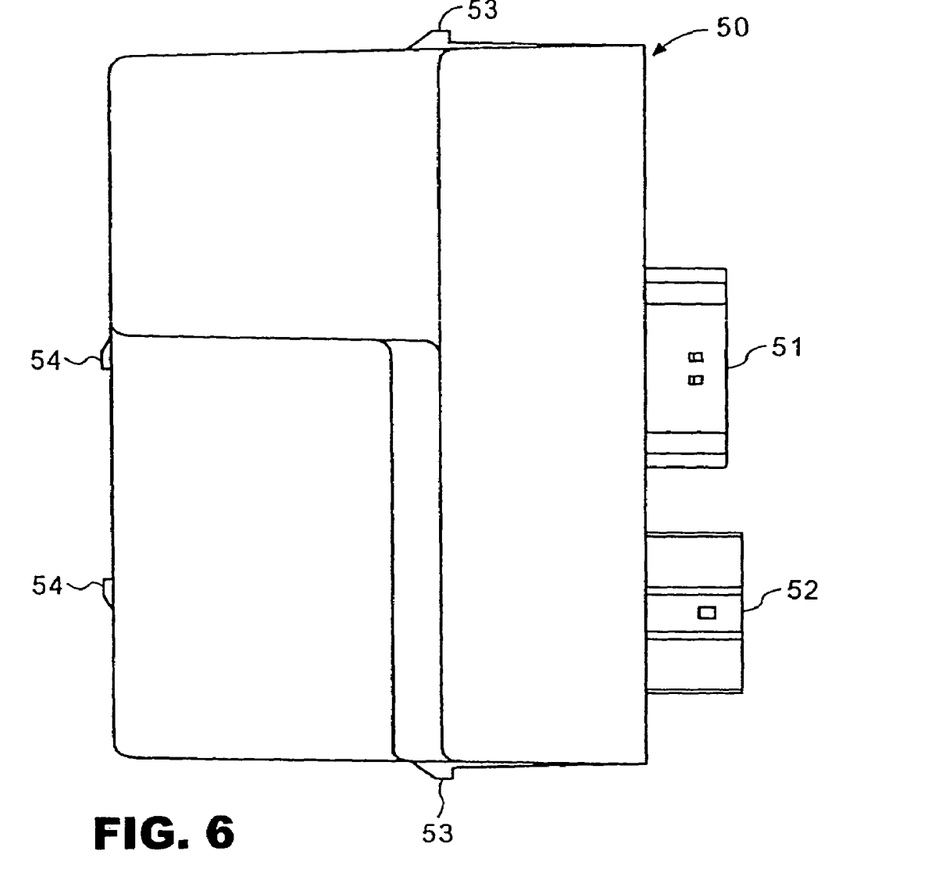
FIG. 6 is a plan view of an engine control box.
Figure 7:
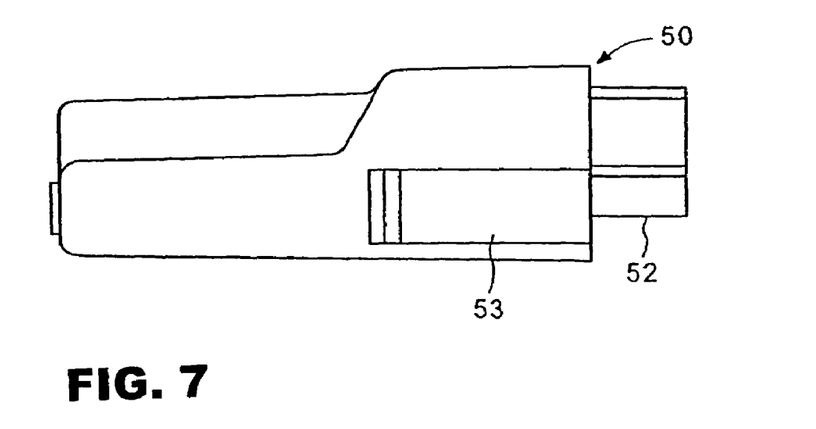
FIG. 7 is a side view of an engine control box.
Figure 8:
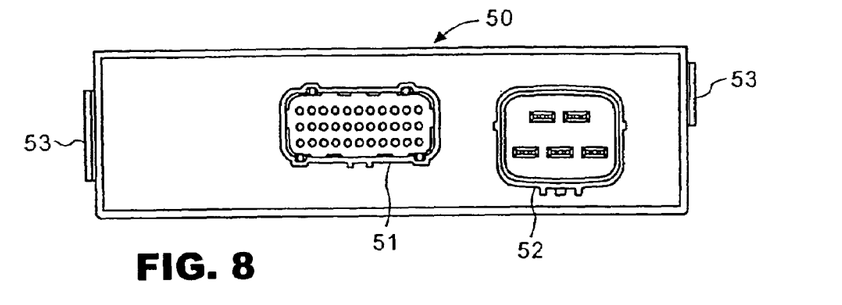
FIG. 8 is a front view of an engine control box.

FIG. 6 is a plan view of the engine control box 50 which is mounted on the vehicle body frame 2 by way of the above-mentioned control box mounting bracket 60, wherein the engine control box 50 incorporates a control circuit which includes a CPU for controlling an engine, a memory and an interface. FIG. 7 and FIG. 8 are respectively a side view and a front view of the engine control box 50. The engine control box 50 has a generally thin rectangular parallelepiped shape, wherein two sockets 51, 52 are formed on a front surface thereof, a pair of engaging pawls 53 are formed on both side surfaces thereof, and a pair of engaging pawls 54 are formed on a back surface thereof.

Figure 9:
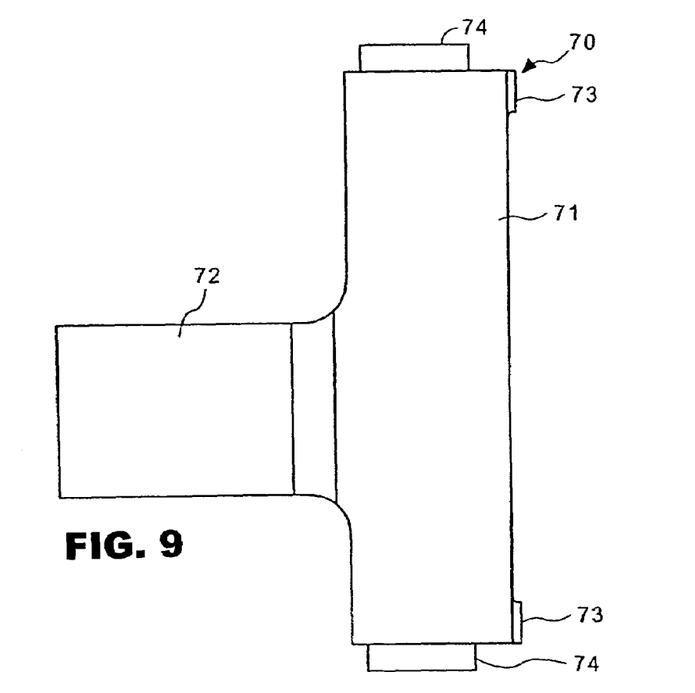
FIG. 9 is a plan view of a buffer protective cover.
Figure 10:
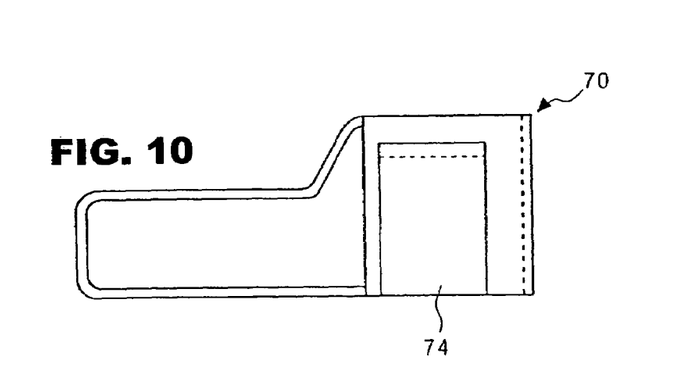
FIG. 10 is a side view of a buffer protective cover.
Figure 11:
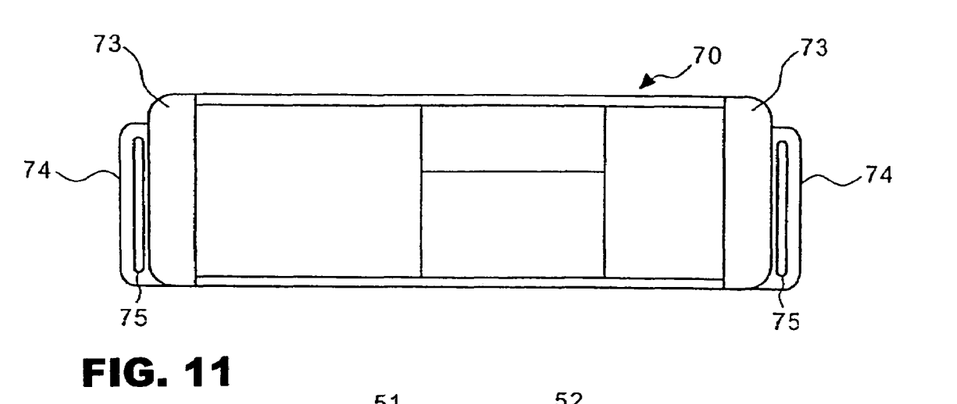
FIG. 11 is a front view of a buffer protective cover.
Figure 12:
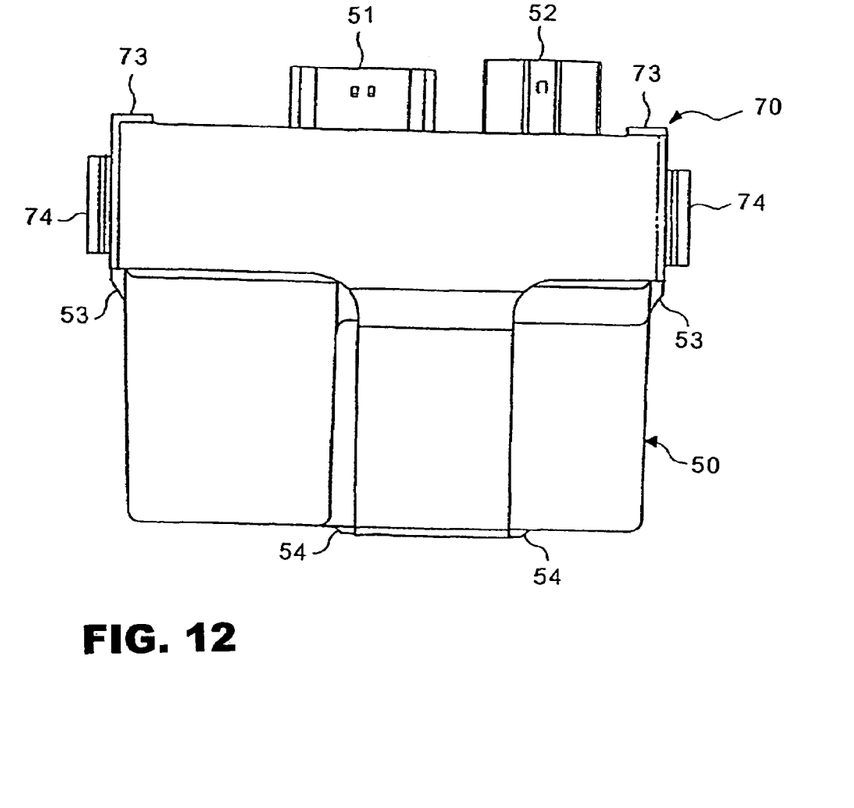
FIG. 12 is a plan view of an engine control box on which a buffer protective cover is mounted.

FIG. 9 is a plan view of a buffer protective cover 70 which is mounted on the above-mentioned engine control box 50, and FIG. 10 and FIG. 11 are respectively a side view and a front view of the engine control box 50. FIG. 12 is a plan view showing a state in which the buffer protective cover 70 is mounted on the engine control box 50.

The above-mentioned buffer protective cover 70 is formed of a resilient member and includes an annular portion 71 which covers an outer peripheral surface in the vicinity of the front side of the engine control box 50 and a lower support portion 72 which restricts a depth position of the engine control box 50 which is inserted into the annular portion 71 from a back surface thereof. Holder portions 74 in which insertion holes 75 are formed in conformity with a cross-sectional shape of upper portions of the left side plates 61L, 61R of the control box mounting bracket 60 are formed on both side portions of the above-mentioned annular portion 71.

The above-mentioned engine control box 50 is inserted into the buffer protective cover 70 from the back surface such that the annular portions 71 is expanded in the widthwise direction, wherein the engine control box 50 is pushed until the back surface impinges on the lower support portion 72. When the engine control box 50 is pushed into a regular position with respect to the buffer protective cover 70, as shown in FIG. 12, the engaging pawls 53 formed on the left and right side surfaces are engaged with end portions of the annular portion 71, the front surface is restricted by a projecting portion 73 of the annular portion 71, and the lower support portion 72 is engaged between the engaging pawls 54 formed on the back surface and hence, it is possible to surely fix the engine control box 50 at a regular position with respect to the buffer protective cover 70.

Figure 13:
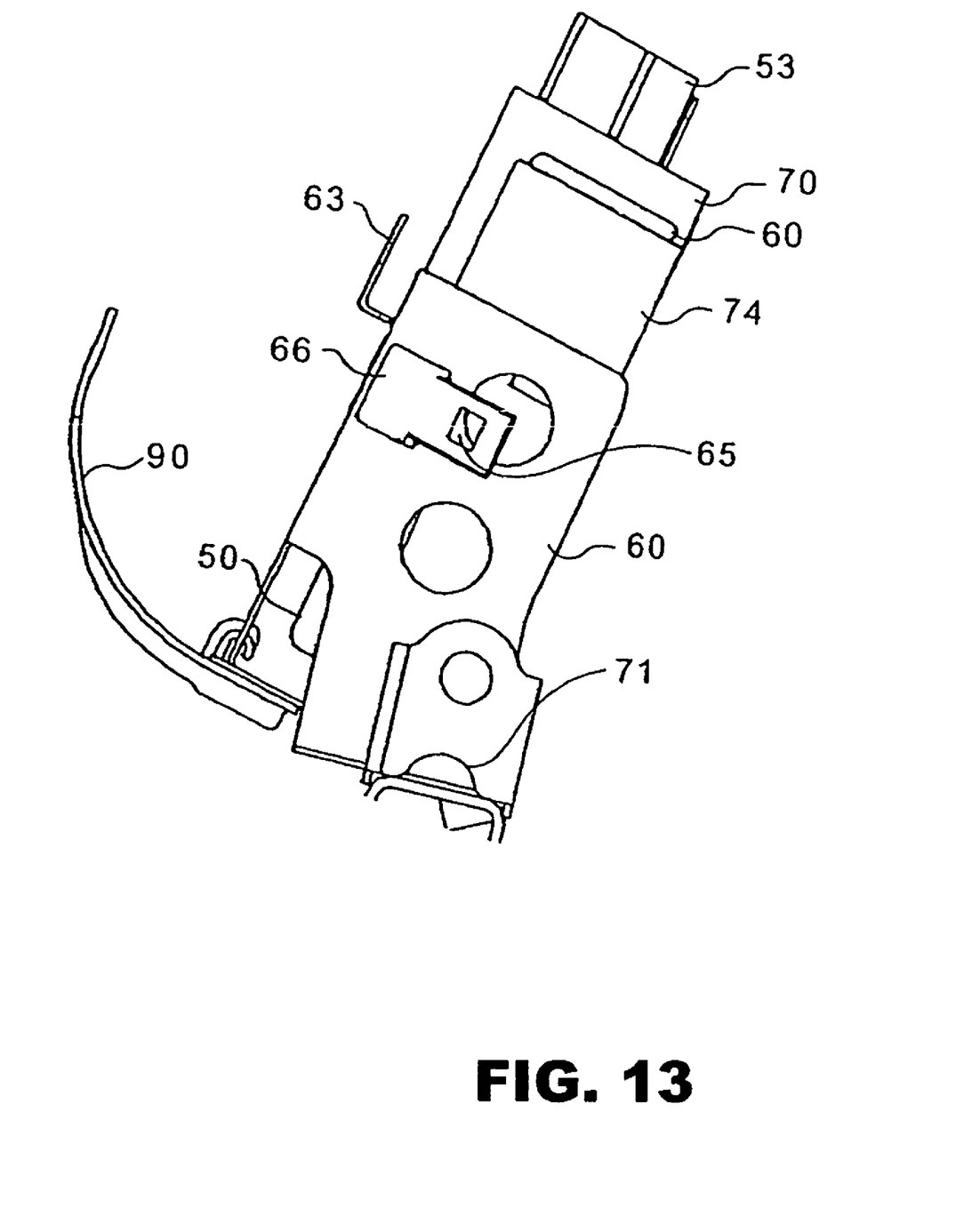
FIG. 13 is a side view showing a supporting method of an engine control box using a control box mounting bracket.

FIG. 13 is a side view showing the supporting method of the engine control box 50 using the above-mentioned control box mounting bracket 60. Here, the protective cover 70 is attached to the engine control box 50. The engine control box 50 is inserted into the control box mounting bracket 60 from above in an erected posture in which a front portion on which the above-mentioned sockets 51, 52 are formed is directed upward. Here, upper portions of the left and right side plates 61L, 61R of the control box mounting bracket 60 are inserted into through holes 75 of the holder portion 74 which are formed on both side surfaces of the protective cover 70 and hence, the engine control box 50 is supported on the control box mounting bracket 60 by way of the protective cover 70 in a state that both side portions of the engine control box 50 are supported in midair. Accordingly, vibrations and impacts which are transmitted from the vehicle body frame 2 to the engine control box 50 can be largely reduced.

Figure 14:
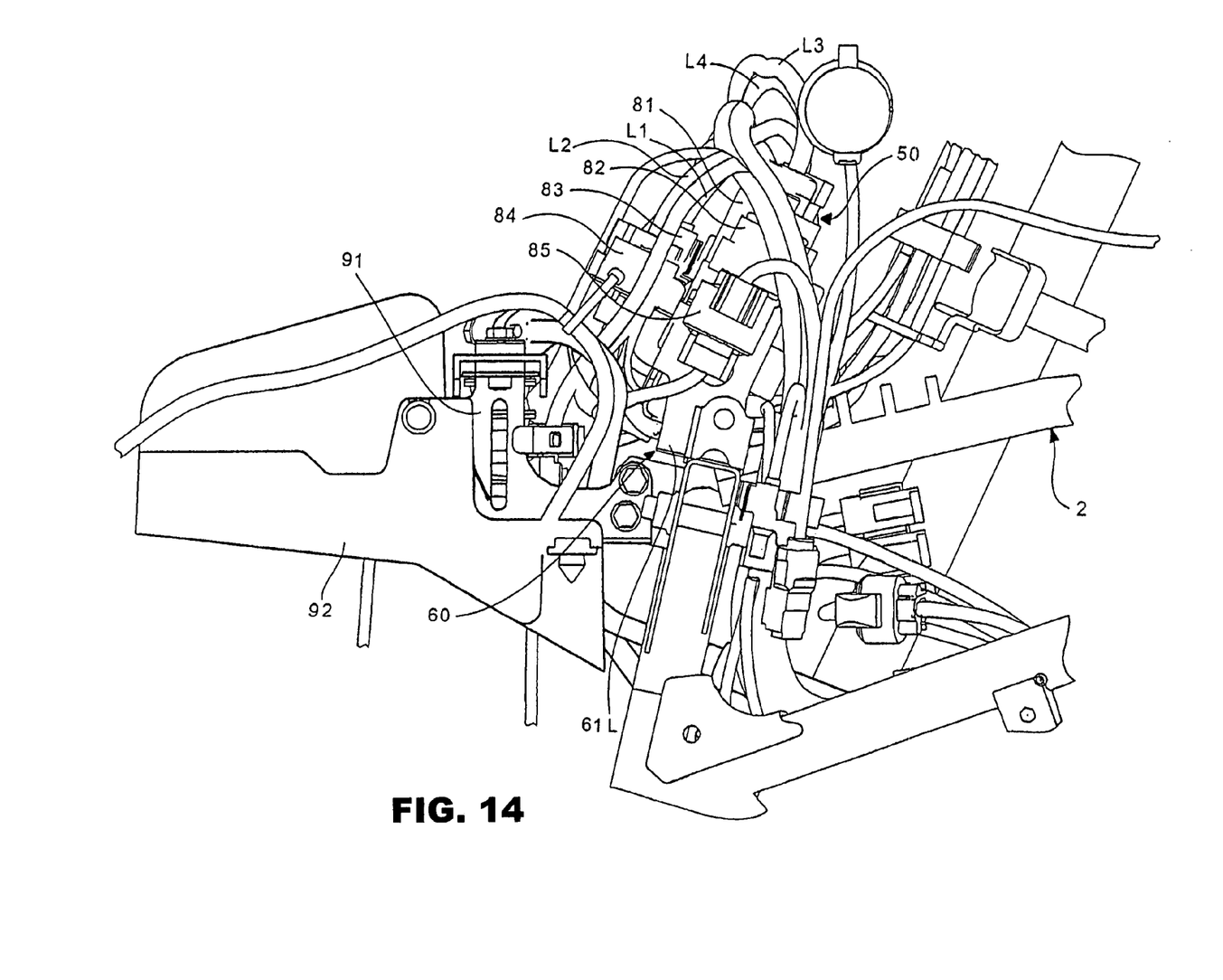
FIG. 14 is a side view of a vehicle front portion in which an engine control box is supported on a control box mounting bracket.
Figure 15:
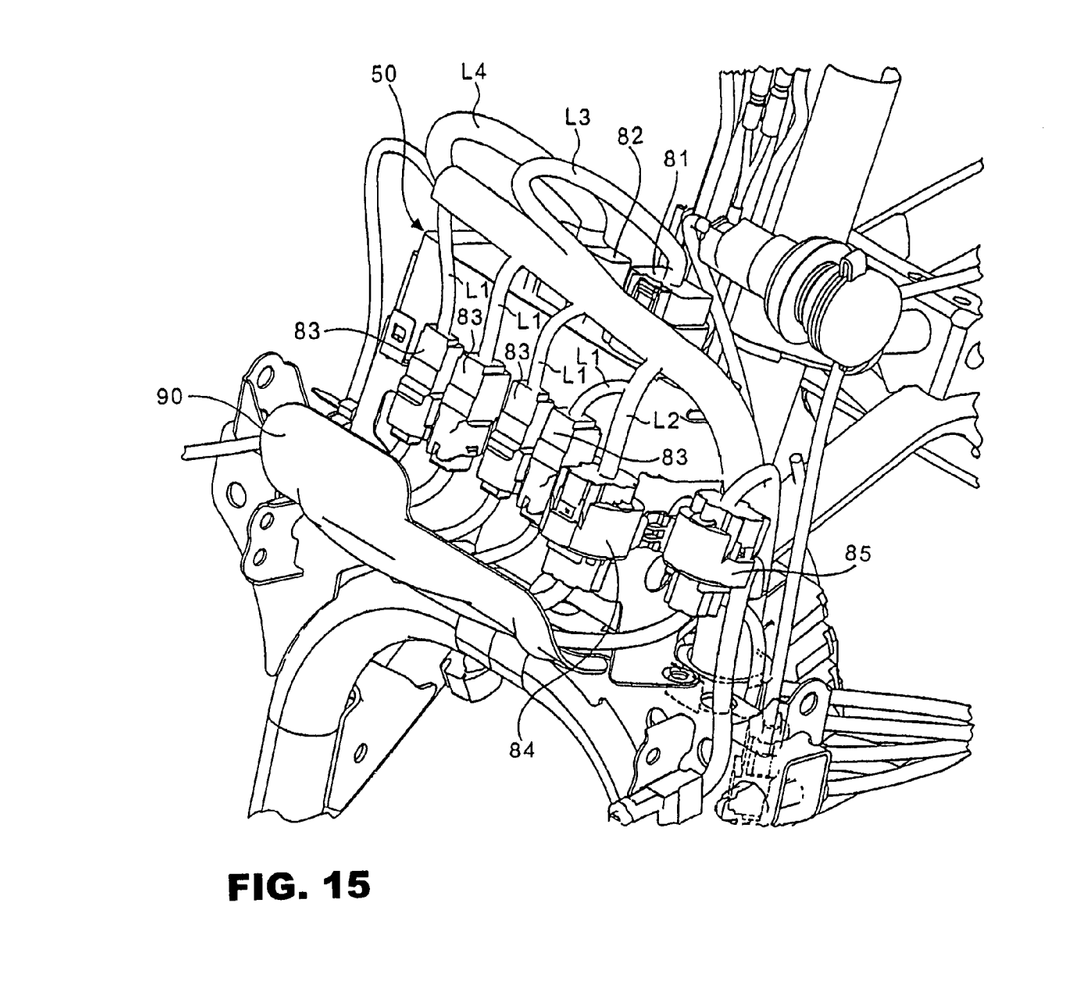
FIG. 15 is a perspective view of a vehicle front portion as viewed from a left oblique frontward direction of a vehicle body.
Figure 16:
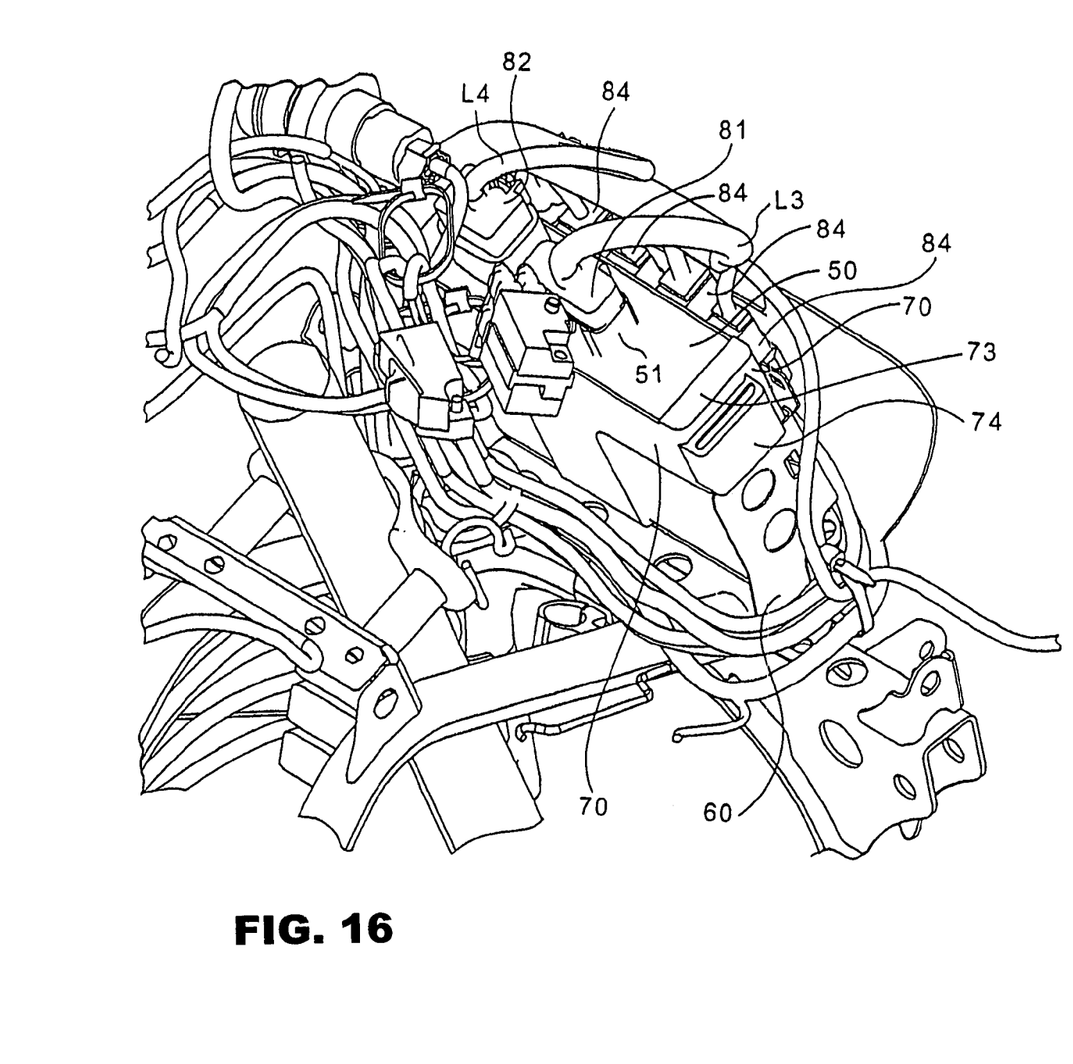
FIG. 16 is a perspective view of a vehicle front portion as viewed from a right oblique rearward direction of a vehicle body.

FIG. 14 is a side view of a front portion of the vehicle in which the above-mentioned engine control box 50 is supported on the control box mounting bracket 60. FIG. 15 is a perspective view of the above-mentioned vehicle front portion as viewed from the left oblique frontward direction of the vehicle body. FIG. 16 is a perspective view of the above-mentioned vehicle front portion as viewed from the right oblique backward direction of the vehicle body. In these drawings, symbols which are equal to the above-mentioned symbols express identical or similar parts.

The above-mentioned engine control box 50 is housed in the inside of the bracket 60 in a posture that the front surface on which the sockets 51, 52 are formed is directed upwardly, while plugs 81, 82 which make pairs with the above-mentioned sockets 51, 52 are mounted in the sockets 51, 52. With the hook 63 which is mounted on the front surface of the above-mentioned bracket 60, a plurality of couplers 83, which are constituted by fitting a pair of male coupler and female coupler, are engaged such that the respective wires are directed similarly in an upward direction. In the same manner, a coupler 84 is engaged with the engaging hole 64 formed in the front surface of the bracket 60, while a coupler 85 is engaged with the engaging hole 65 formed in the left side plate 61L of the bracket 60. The wires L1, L2 which are pulled out upwardly from the respective couplers 83, 84 are bundled with other wires and are connected with the lines L3, L4 of the above-mentioned plugs 81, 82.

An oil cooler 91 and a wind guide plate 92, which guides a traveling wind to the oil cooler 91, are arranged in front of the engine control box 50, The traveling wind which is guided into the oil cooler 91 by the wind guide plate 92 and is heated after passing through the oil cooler 91 while cooling the oil cooler 91. The traveling wind is guided to a lower portion of the vehicle body by the above-mentioned heat shielding plate 90. Accordingly, in this embodiment, it is possible to arrange the engine control box 50 even behind the oil cooler 91.

Although the embodiment of the present invention has been described in detail, it will be understood that the present invention is not limited to the above-described embodiments, and various modifications in design may be made without departing from the spirit and scope of the invention defined in the claims.

We claim:

1. A control box mounting bracket attached to a vehicle body frame that mounts an engine control box on the vehicle body frame in the periphery of the control box mounting bracket, wherein the control box mounting bracket comprises:
    an attaching portion to which the control box is attached;
    a front plate including a plurality of coupler supporting portions;
    a left side plate;
    a right side plate; and
    a guide member which guides wiring harnesses in a predetermined direction and shields said engine control box from heat.

2. A control box mounting bracket according to claim 1, wherein the coupler supporting portions support a plurality of couplers in the same direction.

3. A control box mounting bracket according to claim 1, wherein the control box is attached such that an outer periphery of the control box is covered with a protective cover.

4. A control box mounting bracket according to claim 1, wherein the control box is mounted on a front portion of the vehicle body.

* * * * *